United States Patent
Sekikawa et al.

(10) Patent No.: US 8,859,041 B2
(45) Date of Patent: *Oct. 14, 2014

(54) THERMAL SPRAYING PREPROCESSING METHOD AND A CYLINDER BLOCK OF AN ENGINE SO PREPROCESSED

(75) Inventors: Takashi Sekikawa, Kohnan-Ku (JP); Masahiko Iizumi, Fujisawa (JP); Takashi Ogino, Tsuzuki-Ku (JP); Kimio Nishimura, Tsuzuki-Ku (JP); Eiji Shiotani, Takatsu-Ku (JP); Hideo Takahashi, Hodogaya-Ku (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 2011 days.

This patent is subject to a terminal disclaimer.

(21) Appl. No.: 10/572,137

(22) PCT Filed: Oct. 14, 2005

(86) PCT No.: PCT/IB2005/053386
§ 371 (c)(1),
(2), (4) Date: Jul. 8, 2008

(87) PCT Pub. No.: WO2006/040746
PCT Pub. Date: Apr. 20, 2006

(65) Prior Publication Data
US 2008/0260958 A1    Oct. 23, 2008

(30) Foreign Application Priority Data
Oct. 15, 2004 (JP) .................. 2004-301983

(51) Int. Cl.
| | |
|---|---|
| B05D 7/22 | (2006.01) |
| B23P 9/02 | (2006.01) |
| C23C 28/02 | (2006.01) |
| C23C 24/02 | (2006.01) |
| B24B 33/02 | (2006.01) |
| C23C 26/00 | (2006.01) |
| C23C 4/02 | (2006.01) |

(52) U.S. Cl.
CPC ................ *B23P 9/02* (2013.01); *C23C 28/023* (2013.01); *C23C 24/02* (2013.01); *C23C 28/021* (2013.01); *B24B 33/02* (2013.01); *C23C 26/00* (2013.01); *C23C 28/02* (2013.01); *C23C 4/02* (2013.01)
USPC ........ 427/239; 427/11; 427/289; 427/428.06; 29/888.061; 451/51; 451/61; 451/178; 451/180

(58) Field of Classification Search
CPC ..................................... C23C 4/02; B23P 9/02
USPC .......... 427/446, 239; 451/481, 484, 485, 464, 451/465, 463, 51, 61, 180
See application file for complete search history.

(56) References Cited

U.S. PATENT DOCUMENTS 2,314,902 A    3/1943  Shepard
3,264,978 A *  8/1966  Staley .............................. 101/23
(Continued)

FOREIGN PATENT DOCUMENTS

DE    199 10 578       6/2000
EP    1034882      *  9/2000
(Continued)

OTHER PUBLICATIONS

English Abstract for DE-199 10 578.
(Continued)

*Primary Examiner* — Katherine A Bareford
(74) *Attorney, Agent, or Firm* — Young Basile (57) ABSTRACT

The adhesiveness of a thermal spray coating and a cylinder internal surface is improved by forming a sufficient roughened surface on an internal surface. A processing roller is installed on the main shaft of a processing device via a pressurizing mechanism. An uneven surface is provided on the external periphery of the processing roller. By pressing the processing roller against the internal surface while the roller rotates and moves, a fine unevenness that corresponds to the unevenness of the roller is formed on the cylinder internal surface. A thermal spray coating is formed on the internal surface where the inner surface has been roughened by forming the above-mentioned unevenness.

6 Claims, 5 Drawing Sheets

(56) References Cited

U.S. PATENT DOCUMENTS

| | | | |
|---|---|---|---|
| 3,298,851 A * | 1/1967 | Fuchs | 428/151 |
| 3,678,630 A * | 7/1972 | Borcherding | 451/163 |
| 4,024,672 A * | 5/1977 | Wieck | 451/163 |
| 4,250,135 A * | 2/1981 | Orsini | 264/227 |
| 5,554,411 A * | 9/1996 | Higley et al. | 427/11 |
| 5,622,753 A * | 4/1997 | Shepley et al. | 427/453 |
| 5,918,366 A | 7/1999 | Mori et al. | |
| 5,931,038 A * | 8/1999 | Higashi | 72/70 |
| 6,244,934 B1 | 6/2001 | Miyai et al. | |
| 6,622,685 B2 | 9/2003 | Takahashi et al. | |
| 7,089,662 B2 * | 8/2006 | Izquierdo et al. | 29/888.061 |
| 7,614,272 B2 * | 11/2009 | Sekikawa et al. | 72/214 |
| 2004/0109911 A1 | 6/2004 | Boegli | |
| 2005/0217336 A1 * | 10/2005 | Weidmer | 72/96 |

FOREIGN PATENT DOCUMENTS

| | | | |
|---|---|---|---|
| GB | 2 177 120 | | 1/1987 |
| JP | 57-083419 | * | 5/1982 |

OTHER PUBLICATIONS

English Abstract for JP-2004100645.
English Abstract for JP-59211568.
International Search Report for PCT/IB2005/053386, Apr. 2006.

* cited by examiner

Casting  Roughing  Thermal Spray

THERMAL SPRAYING PREPROCESSING METHOD AND A CYLINDER BLOCK OF AN ENGINE SO PREPROCESSED

RELATED APPLICATIONS

This application claims priority to Japanese Patent Application No. 2004-301983, filed on Oct. 15, 2004. The disclosure of Japanese Patent Application No. 2004-301983, including the specification, drawings and claims, is incorporated herein by reference in its entirety.

FIELD

Disclosed herein is a thermal spraying preprocessing method for forming a rough surface on an internal surface of a cylinder prior to forming the thermal spray coating, and a cylinder block of an engine having a rough surface formed by the method.

BACKGROUND

Conventionally, as described in Japanese Laid Open Patent No. 10-298733, when material whose main component is iron is thermal-sprayed on a cylinder bore of an aluminum cylinder block formed by casting, flux (fluoride salt treatment) is coated on the cylinder bore and dehydration thereof is carried out by heating after cleaning, prior to carrying out a thermal spray process after the casting process, in order to increase the adhesiveness between the material and an inner surface of the cylinder bore (antistripping). Further, a nickel alloy that has high adhesiveness to iron and aluminum is thermal-sprayed on the cylinder bore (bond-coating), and then a material whose main component is iron is thermal-sprayed. In such a conventional process, problems occur due to the processing time required for the pre-thermal spray process and the capital investment therefor (from the cleaning to bond-coating).

When a coating is formed by a thermal spray using a material whose main component is an iron on the internal surface of the cylinder bore of a liner-less aluminum cylinder block, which affects reduction of the weight and the exhaust management of a vehicle engine, the internal surface of the cylinder bore may be required to be rough as a preprocess in order to increase adhesiveness of the thermal spray coating.

The adhesiveness thereof is increased by forming the rough surface since the contact area between the inner surface of the aluminum cylinder block bore and the thermal spray film is increased. That is, if adhesiveness per unit area is the same, the adhesiveness increases as the contact area becomes larger, thereby increasing the adhesiveness therebetween and causing an anchor effect.

For example, Japanese Laid Open Patent No. H11-320414 discloses a shot blast process as a method for forming a rough surface. With this method, shot blast particles may sometimes remain on the processed surface. If the thermal spray coating is formed on the base material under this condition, it becomes unstable in that the residue is exposed on the base material surface or adhesiveness of the thermal spray coating is decreased. As a result, reliability is reduced.

As a method for solving such problems, Japanese Laid Open Patents Nos. H10-77807 and 2002-155350 disclose methods for forming a rough surface on the base material by using a cutting tool.

As disclosed in these patents, since one or more spiral grooves are formed on the surface of the base material by using a cutting tool, the adhesiveness of the thermal spray coating later formed is weak against forces applied in the direction of the spiral grooves. Thus, the roughening of the base material surface is not sufficient and overall sufficient adhesiveness of the thermal spray coating cannot be secured, so that the reliability of the thermal spray coating is reduced.

In the present method, the adhesiveness of the thermal spray coating on the internal surface of the cylinder is improved by forming sufficient roughness on the internal surface of the cylinder.

Specifically, in a thermal preprocessing method for forming a rough surface on the internal surface of the cylinder before a thermal spray coating is formed thereon, the inner surface is sufficiently roughened so as to have an uneven shape on the internal surface of the cylinder by pressing of a processing roller having unevenness on its external periphery surface while it rotates and moves. Thereby, blast particle residue on the internal surface of the cylinder otherwise formed during, for example, a shot blast process, is precluded and sufficient roughening of the internal surface of the cylinder is carried out so that the adhesiveness of the thermal spray coating can be improved. The process can include applying nickel material to the uneven outer surface of the processing roller, and thereafter, bringing the outer surface in contact with the cylinder internal surface, and rotating the processing roller relative to the cylinder internal surface while pressing against the cylinder internal surface to roughen, and at the same time, detaching at least some of the nickel material from the uneven outer surface and attaching at least a portion of the detached nickel material to the cylinder internal surface.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE ILLUSTRATED EMBODIMENTS

A description will now be given referring to embodiments of the present invention. While the claims are not limited to such embodiments, an appreciation of various aspects of the invention is best gained through a discussion of various examples thereof.

The mode of carrying out the present method is described by referring to the drawings.

Figure 1:
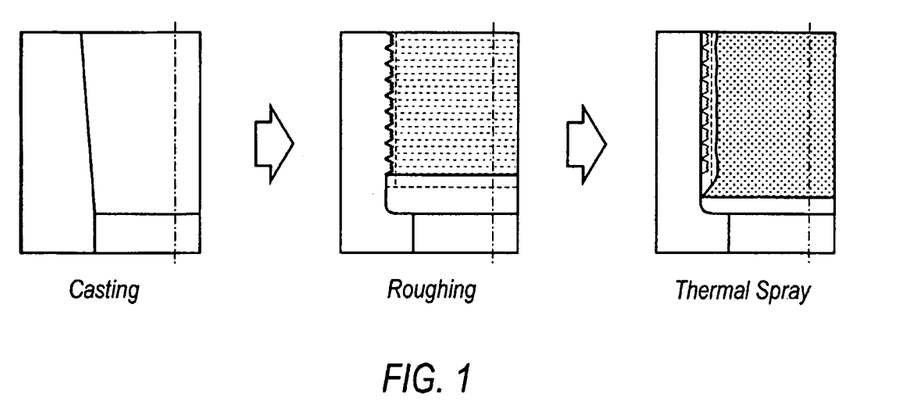
FIG. 1 is an explanatory diagram illustrating a series of processes: casting, roughing and thermal spraying.

FIG. 1 is an explanatory diagram illustrating a series of processes including casting, roughing and thermal spraying. First, a cylinder block is processed by casting to form an inner surface. After that, the inner surface is roughened by a method described below, and then material is thermal sprayed on the roughened surface as shown in FIG. 1.

Figure 2:
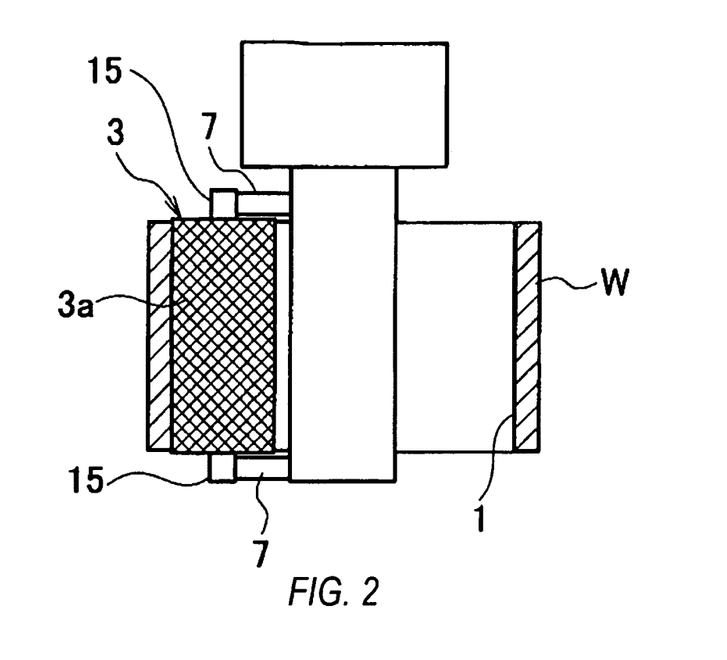
FIG. 2 is a diagrammatic cross-sectional view of a first embodiment of a pressing roller and a workpiece wherein the present thermal spraying pre-processing is carried out.

FIG. 2 is a cross-sectional view of a pressing roller inserted in a workpiece W, illustrating thermal spraying preprocessing according to a first embodiment of the present method.

This thermal spraying preprocessing method uses the pressing or processing roller 3 made of sintered hard alloy during the roughening of the cylinder internal surface 1 of the cylindrical workpiece W. In this case, the workpiece W is a die-cast aluminum alloy (ADC 12 material), and the cylinder internal surface 1 is processed with a certain precision. After a roughened surface is formed on the cylinder internal surface 1, a thermal spray coating is formed of thermal-spraying material, whose main component is iron, on the cylinder inner surface. This is shown in FIG. 1.

As an example of the above-mentioned workpiece W, a cylinder block of an engine is used. In such a case, the roughening process is carried out inside the cylinder bore that corresponds to the cylinder internal surface 1.

The above-mentioned processing roller 3 has an uneven surface 3a formed on its entire external circumferential surface, and the length in the axial direction is slightly greater than that of workpiece W in the same direction. The uneven surface 3a may be formed in several shapes including but not limited to cross hatched, knurled, linear patterns, non-linear patterns or other shapes.

During the processing, as shown in FIG. 2, both edges in the axial direction project externally from the cylinder internal surface 1 of the workpiece W. In addition, the processing roller 3 is mounted on a main shaft 5 (see FIGS. 3 and 7) as a supporting portion of the processing device, which is not shown in the drawings.

The length of the main shaft 5 in the axial direction is greater than the length of the processing roller 3 in the same direction, and the processing roller 3 is mounted on the main shaft 5 by a pair of pressurizing mechanisms 7 disposed on the external circumference adjacent to both edges of the internal surface 1 of the cylinder in the axial direction. Each of the pressurizing mechanisms 7, as shown in an enlarged cross-sectional view in FIG. 3, comprises a large diameter cylinder 9 in which one end thereof is fixed to the main shaft 5, a small diameter cylinder 11, which is movably inserted at the other end of the large diameter cylinder 9, and a coil spring 13 that is contained in each of cylinders 9 and 11.

The outer end of the small diameter cylinder 11 is fixed to a roller-supporting shaft 15 that is provided so as to rotate with respect to the center portion of both axial end surfaces of the processing roller 3. The coil spring 13 is interposed between the main shaft 5 and the roller-supporting shaft 15 so as always to press the processing roller 3 in the direction away from the main shaft 5. During processing, the force exerted by the coil spring 13 and the roller 3 against the cylinder internal surface 1 is, for example, 100 N or greater. A locking device that is not shown in the drawings is provided therebetween so that the small diameter cylinder 11 does not come off from the large diameter cylinder 9 when the processing roller 3 is pulled off from the workpiece W.

Next, an operation of the pressing roller 3 is described. In a state where the main shaft 5 of the processing device is apart from the center of the workpiece W; that is, for example, if the main shaft 5 is moved to the right in FIG. 2 relative to workpiece W from the position shown in FIG. 2, the processing roller 3 will then be away from the cylinder internal surface 1 when it is inserted in the workpiece W.

Next, the center of the main shaft 5 is aligned with the center of the workpiece W, so that as shown in FIG. 2, the processing roller 3 comes into contact with the cylinder internal surface 1 and is pressed against the cylinder internal surface 1 by the coil spring 13 at the above-mentioned force of, for example, 100 N or greater.

Figure 4:
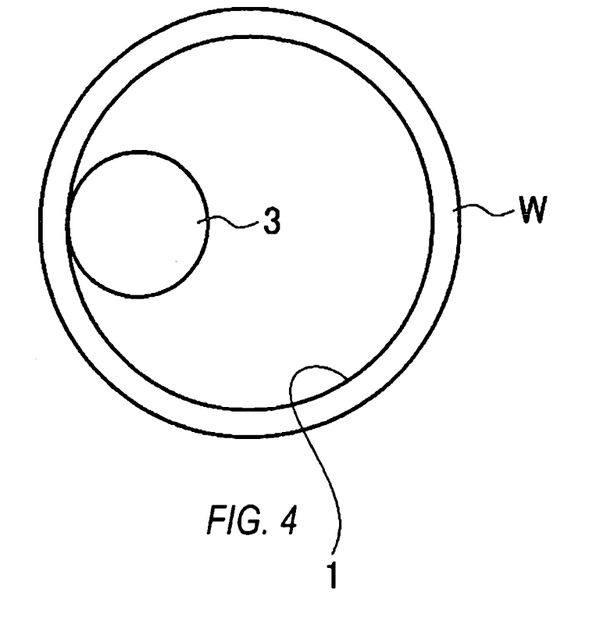
FIG. 4 is a schematic plan view of the pressing roller and workpiece of FIG. 2.
Figure 5:
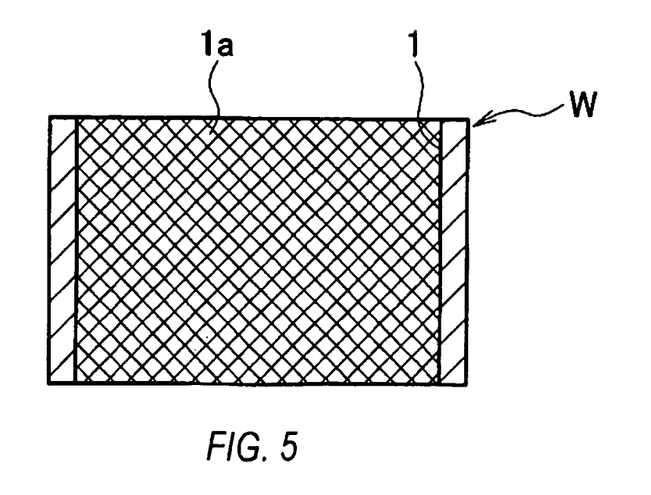
FIG. 5 is a cross-sectional view of a workpiece in a state after the roughening process of the internal surface of the cylinder.

Under this pressurized condition, the main shaft 5 is rotated so that the rotational speed of the processing roller 3 becomes 60 rpm. By doing so, the processing roller 3 moves while rotating and pressing against the cylinder internal wall 1 as shown in the schematic plan view in FIG. 4. Consequently, a rough surface 1a with an uneven shape as shown in FIG. 5 is formed on the cylinder internal surface 1. Then, a thermal spray coating is formed on the cylinder internal surface 1, that is, the rough surface 1a as shown in FIG. 1.

As described above, in accordance with the first embodiment, the cylinder internal surface 1, prior to the formation of the thermal spray coating, is roughened by the processing roller 3 while it is being pressed and moved in rotation. Therefore, without blast particle residue on the cylinder internal surface 1 attached thereto during shot blast processing, a net-like rough surface is formed on the cylinder internal surface 1 that has a finer and more effective roughness compared to the case in which a spiral groove is formed, thereby allowing improved adhesiveness of the thermal spray coating.

In addition, the length of the processing roller 3 in the axial direction is greater than the length of the cylinder internal surface 1 in the same direction. Therefore, a single rotation of the main shaft 5 may complete the roughening process of the entire cylinder internal surface 1, thereby allowing a reduction of the processing time as well as an improvement in productivity compared to the case in which the length of the processing roller 3 in the axial direction is less than that of the cylinder internal surface 1 in the same direction.

Moreover, the processing roller 3 that carries out the processing by pressing against the cylinder internal surface 1 has a longer tool life compared to the case in which spiral grooves are formed by using a cutting tool. That is, when the cutting tool is used, since the inner surface of the cylinder block bore is screw-cut so as to form spiral grooves by the cutting tool, the blade of the cutting tool is worn away. Further, the cutting tool is used for a long time and for a long distance so that the life span of the cutting tool becomes short.

Figure 6:
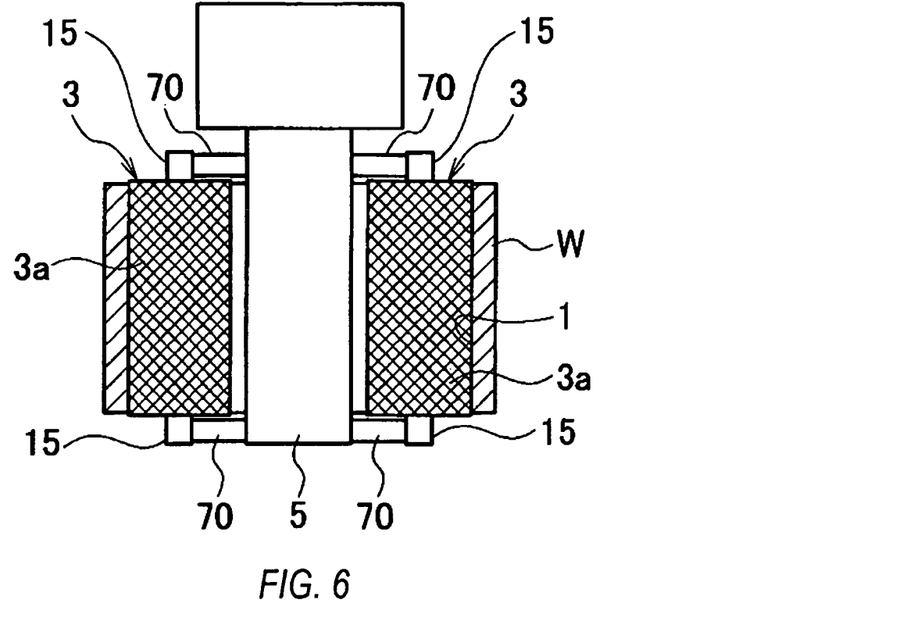
FIG. 6 is a cross-sectional view of a second embodiment of pressing rollers and a workpiece for carrying out thermal spraying preprocessing.

FIG. 6 is a cross-sectional view of a pressing roller inserted in a workpiece W, illustrating a thermal spraying preprocessing method according to a second embodiment thereof. This embodiment is performed with two of the processing rollers 3 shown in the first embodiment. These two processing rollers 3 are provided on opposing sides with respect to the main shaft 5, which is located at the center thereof.

Figure 7:
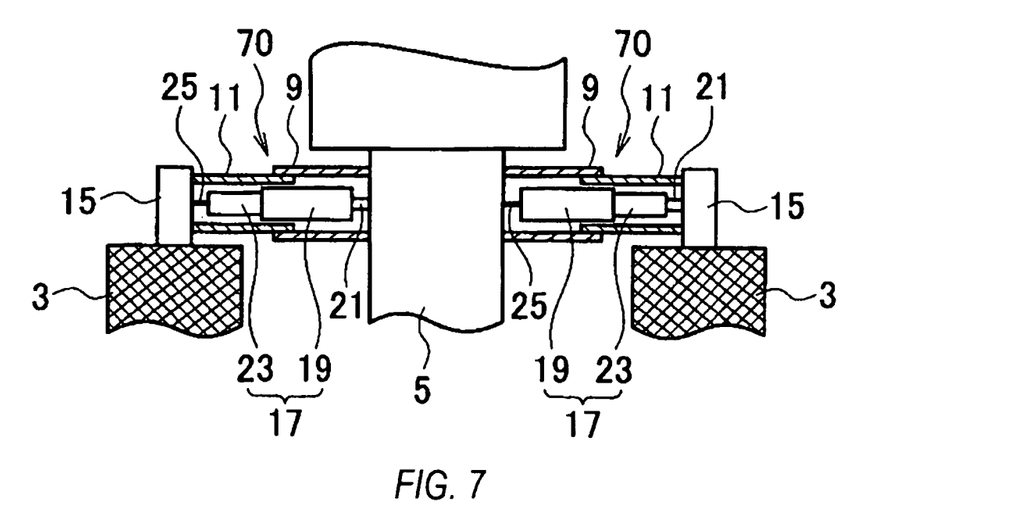
FIG. 7 is an enlarged cross-sectional view of a pressurization mechanism for the pressing roller of FIG. 6.

Still further, hydraulic cylinders 17 may be employed as pressurizing mechanisms 70, as shown in FIG. 7, instead of the coil spring 13 of the first embodiment. In other words, an end of the cylinder body 19 of this hydraulic cylinder 17 is fixed on the main shaft 5 via the supporting arm 21, and an outer end of the piston rod 23 that moves back and force relative to the cylinder body 19 is fixed on the supporting shaft 15 via the connecting arm 25. The external circumference at the edge of the cylinder body 19 is so supported as to move in the axial direction relative to the small diameter cylinder 11.

Although not shown in the figure, a pipe for the hydraulic actuation fluid is drawn outside the processing device via the outside of the cylinder body 19, and inside of the supporting arm 21 and the main shaft 5. The pipe is connected to a hydraulic actuation device, which is not shown in the figure.

Next, an operation of the apparatus is described below. The main shaft 5 of the processing device is inserted in the workpiece W so that the center thereof is aligned with the center of the workpiece W, as shown in FIG. 6. At this time, the piston rod 23 is placed in the retracted position so that each of the processing rollers 3 is away from the cylinder internal surface 1.

In this condition, each piston rod 23 is advanced by driving its respective hydraulic cylinder 17, and each of the processing rollers 3 is pressed against the cylinder internal surface 1 as shown in FIG. 6. During this time, the pressurizing force is, for example, 100 N or greater as described above.

Under this pressurized condition, as in the first embodiment, the main shaft 5 is rotated so that the rotational speed of the processing rollers 3 becomes 60 rpm. Each of the processing rollers 3 moves around the center of the main shaft while rotating and pressing against the cylinder internal surface 1. Consequently, the net-like rough surface 1a as shown in FIG. 6 is formed on the cylinder internal surface 1. Then a thermal spray coating is formed on the cylinder internal surface 1 that is the rough surface 1a by a method described later.

In the second embodiment, the same effect can be obtained as in the first embodiment, such as a sufficiently uneven surface being provided on the cylinder internal surface 1. In addition, the reaction forces of the processing pressure by the two processing rollers 3 against the cylinder internal surface 1 oppose each other, thereby allowing a stable processing pressure to be applied to the cylinder internal surface 1, whereby an efficient roughening process can be carried out.

In addition, when powder nickel material is attached by using a binder on the contacting portion between the processing roller 3 and the cylinder internal surface 1 in the above-mentioned embodiments, the rough surface 1a can be formed and at the same time the nickel material can be attached on the above-mentioned rough surface 1a when the processing roller 3 is pressed against the cylinder internal surface 1.

The nickel material has a higher adhesiveness to a material whose main component is iron, which is used as the thermal spraying material, compared to the aluminum material that forms the cylinder internal surface 1. Therefore, by adhering the nickel material to the cylinder internal surface 1, the adhesiveness of the thermal spray coating can be further improved. In addition, when the thermal spray material is sprayed on the cylinder internal surface 1, the powder nickel material is fused by heat of the thermal spraying, thereby further improving the adhesiveness of the thermal spray coating on the cylinder internal surface 1.

Figure 3:
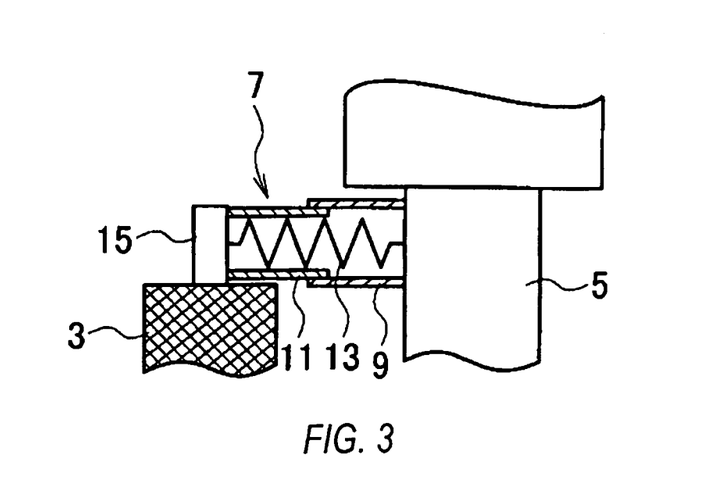
FIG. 3 is an enlarged cross-sectional view of a pressurization mechanism for the pressing roller of FIG. 2.

Instead of the coil spring 13 of the first embodiment having a single processing roller 3, as shown in FIGS. 2 and 3, a hydraulic cylinder 17 in the second embodiment, as shown in FIGS. 6 and 7, can be used. In addition, instead of the hydraulic cylinder 17 in the second embodiment in which the two processing rollers 3 are provided, the coil spring 13 of the first embodiment can be used. In this case, when the processing rollers 3 that are provided on both sides of the main shaft 5 are inserted in the workpiece W, retaining mechanisms may be required to retain the respective coil spring 13 in a compressed state between the large diameter cylinder 9 and the small diameter cylinder 11 so that each processing roller is away from the cylinder internal surface 1.

Figure 8:
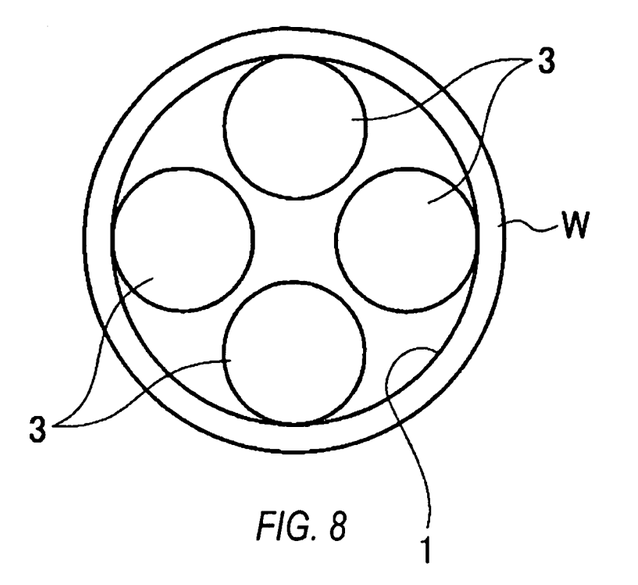
FIG. 8 is a schematic plan view of an example of four processing rollers.

In addition, as shown in the schematic plan view in FIG. 8, four processing rollers 3 can be provided in the peripheral direction of the workpiece W at equal intervals.

The cylinder internal surface 1 is not limited to the internal surface of a cylinder bore of an engine cylinder block, and the present method can be applied to other internal or external surfaces. Also, the present method can be applied to workpieces having any shape, or surface, for example a flat surface.

Furthermore, the shape of the roughness of the cylinder internal surface 1 processed by the thermal spray preprocess described above, is measured by a non-contacting-type shape measurement device such as a laser, and the precision is confirmed.

Figure 9:
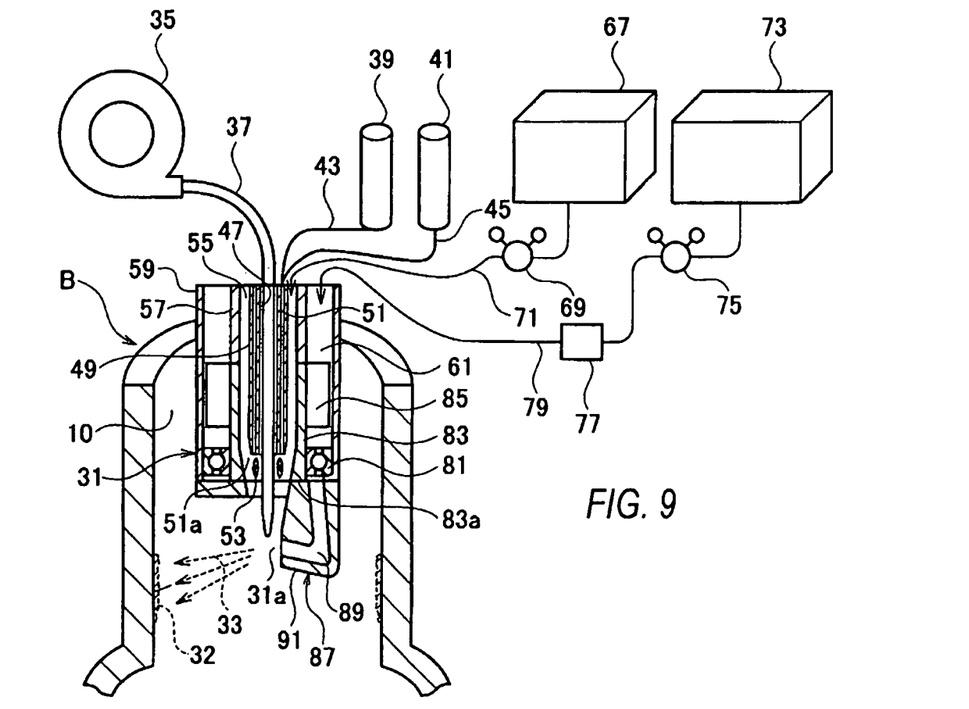
FIG. 9 is an overall schematic view of the thermal spraying device.

FIG. 9 is an overall schematic view of the thermal spraying device that forms a thermal spray coating after roughening the cylinder bore internal surface 10 of the cylinder block B that is equivalent to the above-mentioned workpiece W. In the thermal spraying device, a gas-spraying-type thermal spraying gun 31 is inserted at the center of the cylinder bore, and spraying drops 33, which are fused metal material whose main component is iron are sprayed as the thermal spraying material from a spraying nozzle 31a so that thermal spray coating 32 is formed on the cylinder bore surface 10.

Metal material whose main component is iron is supplied to the thermal spraying gun 31 as thermal wire rod 37 from the thermal spray feeder 35, and combustion gas and oxygen are respectively supplied via pipes 43 and 45 from a combustion gas cylinder 39 in which fuel such as acetylene, propane or ethylene, is stored, and an oxygen cylinder 41 in which oxygen is stored.

The above-mentioned thermal wire rod 37 sends the material downwardly from the top edge of the thermal wire rod feeding hole 47 that vertically penetrates the center of the thermal spraying gun 31. The fuel and the oxygen are fed to a gas guiding path 51 that is formed to vertically penetrate through the cylinder portion 49, which is outside the thermal wire rod feeding hole 47. The mixed feed gas of the fuel and oxygen flows out from the bottom opening 51a of the gas guiding path 51 in FIG. 9 and is ignited to form a combustion flame 53.

An atomized air flow path 55 is provided on the external circumference of the above-mentioned cylinder 49, and on its farther external periphery an accelerator air flow path 61 is formed between a partitioning wall 57 and an external wall 59, which are both in a cylindrical shape.

Atomized air that flows in the atomized air flow path 55 sends the heat of the combustion flame 53 to the front (downwards in FIG. 9), thereby cooling the circumference, and also sends the fused thermal wire rod 37 to the front. The accelerator air that flows along the accelerator air flow path 61 sends the thermal wire rod 37, which was sent upwards and fused as the fused drops 33, towards the cylinder bore internal surface 10, perpendicularly to the feeding direction, so as to form the thermal spray coating 32 on the cylinder bore internal surface 10.

Atomized air is supplied to the atomized air flow path 55 from the atomized air supplying source 67 via the air feeding pipe 71, which has a decompression valve 69. The accelerator air is supplied to the accelerator air flow path 61 from the accelerator air supplying source 73 via an air feeding pipe 79, which has a decompression valve 75 and a micro-mist filter 77.

The partition wall 57 between the atomized air flow path 55 and the accelerator air flow path 61 comprises a rotation cylinder 83 that is rotatable relative to the external wall 59 via a bearing 81 on its bottom edge in FIG. 9. A rotating blade 85 located in the accelerator air flow path 61 is provided on the top external circumference of the rotation cylinder 83. When accelerator air that flows in the accelerator air flow path 61 is applied to the rotating blade 85, the rotation cylinder 83 rotates.

An edge member 87 that rotates in an integrated manner with the rotation cylinder 83 is fixed on an edge (bottom edge)

surface 83*a* of the rotation cylinder 83. A projected portion 91, having an injection flow path 89 that is connected to the accelerator air flow path 61 via the bearing 81, is provided on a portion of the circumference of the edge member 87. The spraying nozzle 31*a* that sprays the fused drops 33 is provided on the edge of the injection flow path 89.

The edge member 87 having the spraying nozzle 31*a* rotates in an integrated manner with the rotation cylinder 83 while the spraying gun 31 is moved in the direction of the axis of the cylinder bore, thereby allowing the formation of the thermal spray coating 32 on almost the entire area of the cylinder bore internal surface 10.

Although only certain exemplary embodiments have been described in detail above, those skilled in the art will readily appreciate that many modifications are possible in the exemplary embodiments without materially departing from the novel teachings and advantages set forth herein. Accordingly, all such modifications are intended to be included within the scope of the appended claims.

What is claimed is:

1. A method of processing a workpiece surface of a workpiece, comprising:
    applying a nickel material to an uneven outer surface of a processing roller, and thereafter, bringing the uneven outer surface into contact with a workpiece surface comprising at least one inner surface of an aluminum alloy cylinder block of an engine;
    pressing the processing roller against the workpiece surface; and
    rotating the processing roller relative to the workpiece surface, while pressing against the workpiece surface, thereby roughening the workpiece surface, detaching at least some of the nickel material from the uneven outer surface and attaching at least a portion of the detached nickel material to the workpiece surface and at the same time.

2. The method according to claim 1, the processing roller having the uneven outer surface throughout an entire external circumference thereof, and a length of the uneven outer surface being greater in an axial direction than the length of the workpiece surface in the same axial direction.

3. The method according to claim 1, further including:
    rotating the processing roller at a speed of at least 60 rpm.

4. The method according to claim 1, wherein:
    the pressing is performed using a pair of pressurizing mechanisms, each of the pair having a first end attached to a respective axial end of a roller-supporting shaft for the processing roller and a second end attached to a center supporting element that is spaced apart from the roller-supporting shaft, the roller-supporting shaft rotatable with respect to a center portion of both axial ends of the processing roller; and
    the rotating is performed by rotating the processing roller relative to the workpiece surface around the center supporting element.

5. The method according to claim 4, wherein the processing roller comprises a plurality of processing rollers supported by the center supporting element and spaced at generally equal intervals around the center supporting element.

6. The method according to claim 4, wherein the processing roller is one of a pair of the processing rollers supported on opposite sides of the center supporting element.

* * * * *